(12) United States Patent
Shi

(10) Patent No.: US 12,165,340 B2
(45) Date of Patent: Dec. 10, 2024

(54) HARDWARE-BASED POINT-CLOUD MATCHING

(71) Applicant: Pony AI Inc., Grand Cayman (KY)

(72) Inventor: Hao Shi, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 213 days.

(21) Appl. No.: 17/578,393

(22) Filed: Jan. 18, 2022

(65) Prior Publication Data

US 2023/0230260 A1 Jul. 20, 2023

(51) Int. Cl.
*G06T 7/30* (2017.01)
*G06V 10/74* (2022.01)

(52) U.S. Cl.
CPC .............. *G06T 7/30* (2017.01); *G06V 10/761* (2022.01); *G06T 2207/10028* (2013.01)

(58) Field of Classification Search
CPC ............ G06T 7/30; G06T 2207/10028; G06V 10/761
See application file for complete search history.

(56) References Cited

U.S. PATENT DOCUMENTS

| | | | |
|---|---|---|---|
| 6,701,006 B2* | 3/2004 | Moore | G06V 10/757 |
| | | | 382/294 |
| 10,242,458 B2* | 3/2019 | Nash | G06T 7/73 |
| 10,482,619 B2* | 11/2019 | Ebrahimi Afrouzi | G01S 17/89 |
| 11,024,055 B2* | 6/2021 | Hsu | H04N 13/156 |
| 11,049,767 B2* | 6/2021 | Huang | H01L 21/7684 |
| 11,151,890 B2* | 10/2021 | Yang | G09B 5/10 |
| 11,859,973 B2* | 1/2024 | Liu | G01C 21/206 |
| 11,887,271 B2* | 1/2024 | Tang | G06T 19/20 |
| 11,922,658 B2* | 3/2024 | Zhang | G06T 17/00 |
| 11,953,599 B2* | 4/2024 | Toledano | G01S 17/86 |
| 12,017,680 B2* | 6/2024 | Fowe | G01C 21/3815 |

* cited by examiner

*Primary Examiner* — Gregory M Desire
(74) *Attorney, Agent, or Firm* — Sheppard, Mullin, Richter & Hampton LLP; Xin Xie

(57) ABSTRACT

A computing component implemented as part of a vehicle architecture and configured to process point cloud data. The computing component comprising one or more programmable logics that, when executed, cause the computing component to generate one or more transformations to align scans of point cloud data, translate the aligned scans of the point cloud data to a universal coordinate system, and generate addresses and offsets to store the aligned scans of the point cloud data.

20 Claims, 7 Drawing Sheets

HARDWARE-BASED POINT-CLOUD MATCHING

BACKGROUND

In autonomous or semi-autonomous vehicles or robotics, sensing of environments can be performed through sensors onboard the vehicles or robotics to help the vehicles or robotics navigate in the environments. For example, light detection and ranging (LiDAR) sensors and cameras onboard a vehicle can scan environments in which the vehicle operates. Under conventional approaches, general computing processors, such as central processing units (CPUs) and/or graphics processing units (GPUs), may be used to process data obtained by the LiDAR sensors or the cameras. For example, one or more GPUs onboard a vehicle can be used to generate scans of point cloud data of environments based on laser data obtained by a LiDAR sensor. As another example, the one or more GPUs may further perform additional processing to fuse data obtained by cameras to the point cloud data. As operations become more complex and as more data is processed, conventional approaches of using general computing processors to process sensor data may not scale technologically and economically.

SUMMARY

Various embodiments of the present disclosure can include a computing component implemented as part of a vehicle architecture and configured to process point cloud data. The computing component comprises one or more programmable logics that, when executed, cause the computing component to generate one or more transformations to align scans of point cloud data, translate the aligned scans of the point cloud data to a universal coordinate system, and generate addresses and offsets to store the aligned scans of the point cloud data.

In some embodiments, the one or more transformations can be transformation matrices that operate on the scans of the point cloud data.

In some embodiments, the transformation matrices can perform at least one of a translation operation, a translation operation, a reflection operation, or a glide reflection operation.

In some embodiments, the one or more transformations are implemented based on a plurality of logic blocks.

In some embodiments, a first logic block of the plurality of logic blocks can be configured to generate the matrices, a second logic block of the plurality of logic blocks can be configured to generate conjugates associated with the matrices, and a third logic block of the plurality of logic blocks can be configured to apply the matrices and the conjugates to the scans of the point cloud data.

In some embodiments, the universal coordinate system can be a world coordinate system.

In some embodiments, the one or more programmable logics can be further configured to determine a matching score for the aligned scans of the point cloud data.

In some embodiments, the matching score can indicate whether environments depicted in the aligned scans of the point cloud data are same.

In some embodiments, the one or more programmable logics can be implemented on one or more field-gate programmable arrays.

In some embodiments, the addresses and the offsets can be associated with memory modules of the one or more field-gate programmable arrays.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In autonomous vehicles, sensing of environments can be performed through sensors onboard the autonomous vehicles to help the autonomous vehicles navigate in the environments. For example, light detection and ranging (LiDAR) sensors and cameras onboard the autonomous vehicles can be used to scan environments in which the autonomous vehicles operate. In general, the autonomous vehicles can be equipped with onboard general computing processors, such as central processing units (CPUs) and/or graphics processing units (GPUs), to process data obtained by the LiDAR sensors or cameras. For example, one or more GPUs onboard an autonomous vehicle can be used to generate point cloud data of environments based on laser data obtained by a LiDAR sensor. As another example, in some cases, the one or more GPUs may further perform additional processing to fuse data obtained by cameras to the point cloud data. However, as autonomous vehicles perform more complex operations and more sensor data are processed. As such, using general computing processors to process sensor data may not scale technologically and economically to handle processing of the sensor data.

Described herein is a solution that addresses the problems described above. In various embodiments, a hardware-based data processing unit can be implemented to offload processing performed by general computing processors. In particular, the data processing unit can be configured to perform scan matching to offload the general computing processors from performing scan matching. In general, scan matching is a technique in which scans of point cloud data of an environment are evaluated to determine whether the scans represent the same environment. Such a scan matching technique is crucial, for example, in simultaneous localization and mapping (SLAM) applications in which an autonomous vehicle must simultaneously determine its location relative to objects and/or landmarks in an environment (i.e., localization) and simultaneously generate a map of the environment including the objects and/or landmarks (i.e., mapping). As such, by having a custom hardware-based solution (i.e., the data processing unit) to augment general computing processors, the general computing processors can be offloaded from performing scan matching. In this way, the general computing processors can be offloaded to perform other computational tasks. Further, because the general computing processors are offloaded from performing scan matching, memory utilization can be improved as result. In this way, operations to be performed by autonomous vehicles can scale without increasing number of general computing processors. The data processing unit is described in further detail below.

Figure 1:
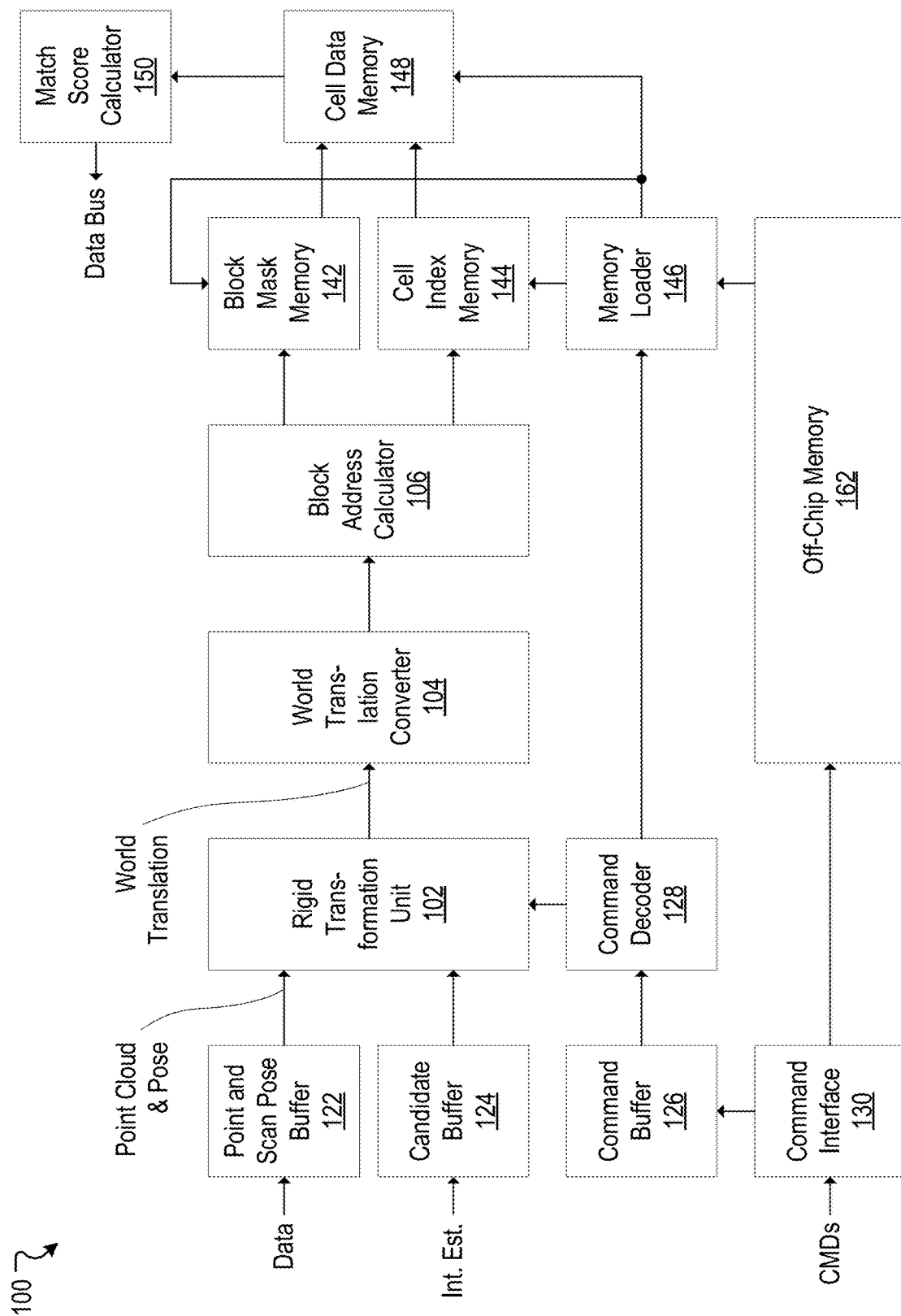
FIG. 1 illustrates a block diagram of a data processing unit, according to various embodiments of the present disclosure.

FIG. 1 illustrates a block diagram of a data processing unit 100, according to various embodiments of the present disclosure. The data processing unit 100 can be configured to perform scan matching of point cloud data obtained by a LiDAR sensor. As discussed above, in this way, scans of the point cloud data can be evaluated to determine whether the scans represent the same environment. Also discussed above, the data processing unit 100 can augment general computing processors to offload scan matching from the general computing processors. In various embodiments, the data processing units 100 can be implemented on one or more field-programmable gate arrays (FPGAs) or other suitable programmable logic. In such embodiments, the FPGA can be configured or programmed to perform computing tasks associated with the data processing unit 100. For example, an FPGA can be programmed to perform rigid transformations and output resulting data to an off-chip memory module over a data bus. In some embodiments, the data processing units 100 can be implemented on one or more application-specific integrated circuits (ASICs). Many variations are possible. As shown in FIG. 1, in some embodiments, the data processing unit 100 can include a rigid transformation unit 102, a world translation converter 104, and a block address calculator 106. Each of these units will be discussed in further detail below.

In some embodiments, the rigid transformation unit 102 can be configured or programmed to perform computations relating to rigid transformations. In general, rigid transformations are geometric transformations in which scans of cloud point data are adapted or oriented to be based on a common coordinate system to preserve distances of objects or marks depicted in the scans of the point cloud data. Rigid transformations are further described in application Ser. No. 17/124,444, filed on Dec. 16, 2020, which is hereby incorporated by reference in its entirety. In this way, scans of point cloud data taken at different timestamps can be compared to determine a location of an autonomous vehicle relative to the objects or marks. In some embodiments, rigid transformations can include at least one of rotations, translations, reflections, or glide reflections. In some embodiments, rigid transformations can include two or more of rotations, translations, reflections, or glide reflections. For example, a rigid transformation of scans of point cloud data may comprise a rotation followed by a translation. In some embodiments, the rigid transformation unit 102 can be configured or programmed to include one or more pipeline logics. Each pipeline logic of the one or more pipeline logics can perform a rigid transformation operation. For example, a first pipeline logic can perform a rotation operation to rotationally align a first scan of point cloud data to a second scan of point cloud data. Similarly, a second pipeline logic can perform a translation operation to linearly align, in a Cartesian coordinate system, or some other coordinate system such as a polar coordinate system, the first scan of the point cloud data to the second scan of the point cloud data. Many variations are possible. For example, a third pipeline logic can perform a reflection operation to cause the first scan of the point cloud data to be a mirror image of the second scan of the point cloud data. Such an operation may be needed, for example, if the point cloud data is captured by two different LiDAR sensors mounted differently from each other. The pipeline logics of the rigid transformation unit 102 will be discussed in further detail with reference to FIGS. 2-3 herein.

As shown in FIG. 1, in some embodiments, the data processing unit 100 can further include a point and scan pose buffer 122 and a candidate buffer 124 coupled to the rigid transformation unit 102. The point and scan pose buffer 122 can store scans of point cloud data captured by a LiDAR sensor. Additionally, the point and scan pose buffer 122 can further store pose estimates associated with an autonomous vehicle onboarded with the LiDAR sensor. In general, a pose of an autonomous vehicle is a position of the autonomous vehicle relative to one or more landmarks of an environment. The rigid transformation unit 102 can access the scans of the point cloud data and determine locations associated with the scans of the point cloud data based on the pose estimates of the autonomous vehicle capturing the point cloud data. Based on the pose estimates, if the rigid transformation unit 102 determines that the scans of the point cloud data correspond to the same particular environment, the rigid transformation unit 102 can then proceed to perform rigid transformation operations to the scans of the point cloud data to align the scans to a reference (i.e., an object or a landmark). In general, because objects and/or landmarks are represented as data points in point cloud data, rigid transformation operations involve iterations that minimizes distances between data points in two different scans of point cloud data, a candidate correspondence can be used as an estimate (i.e., an initial guesstimation) to reduce a number of iterations to be performed to align the two different scans of the point cloud data. The candidate buffer 124 can store such candidate correspondences associated with scans of point cloud data stored in the point and scan pose buffer 122. In this way, the rigid transformation unit 102 can reduce a number of iterations to be performed in performing rigid transformation operations.

In general, data relating to scans of point cloud data, pose estimates, and candidate correspondences stored in the point and scan pose buffer 122 and the candidate buffer 124, respectively, are stored in a fixed point format. For example, in some embodiments, data relating to scans of point cloud data, pose estimates, and candidate correspondences can be based on a Q20.28 format. In this data format, integers are stored as 20-bit data and fractions are stored as 28-bit data. To accelerate rigid transformation computations, in some embodiments, for translation operations, data relating to scans of point cloud data, pose estimates, and candidate correspondences can be based on a Q12.23 format. In this data format, integers are stored as 12-bit data and fractions are stored as 23-bit data. For quaternion operations, data relating to scans of point cloud data, pose estimates, and candidate correspondences can be based on a Q4.23 format. In this data format, integers are stored as 4-bit data and fractions are stored as 23-bit data. Because these data formats have reduced data width (i.e., bit width) than the Q20.28 format, less memory space is utilized and, as a result, computations can be accelerated. For example, assume that the rigid transformation unit 102 performs a rigid transformation comprising a translation followed by a rotation of point cloud data using the Q20.28 format. The translation has three components (T0, T1, and T2; or X, Y, and Z) and the rotation has four components (Q0, Q1, Q2, and Q3). In this example, under the Q20.28 format, a scan of point cloud data, a pose estimate, and a candidate correspondence can be represented as (3*48), ((3*48)+(4*48)), and ((3*48)+(4*48)), respectively. As such, memory space needed for this rigid transformation is 816 bits. In this example, if rotations are represented in the Q4.23 format, integers can be reduced from 20 bits to 4 bits, thereby needing 72 bits of less memory space and thereby accelerating rigid transformation computations.

In some embodiments, the world translation converter 104 can be configured or programmed to translate aligned scans of point cloud data into a world coordinate system. In general, a world coordinate system is a fixed universal coordinate system in which objects or landmarks depicted in the point cloud data are placed in a common coordinate system. In the world coordinate system, the x-axis usually runs from front to back of a vehicle or object, the y-axis usually runs from side to side of the vehicle or object, and the z-axis usually runs from top to bottom of the vehicle or object. As such, the world translation converter 104 can perform translations of the aligned scans of the point cloud data so that an autonomous vehicle from which the point cloud data was captured is aligned in accordance with the world coordinate system. That is, front and back of the autonomous vehicle are aligned along the x-axis of the work coordinate system, left and right of the autonomous vehicle are aligned along the y-axis of the work coordinate system, and finally, top and bottom of the autonomous vehicle are aligned along the z-axis of the work coordinate system. In this way, the aligned scans of the point cloud data can be evaluated from perspectives of the autonomous vehicle.

In some embodiments, the block address calculator 106 can be configured or programmed to determine or calculate memory addresses and memory offsets to which aligned scans of point cloud data are to be stored. In general, to optimize memory storage utilization, the aligned scans of the point cloud data can be divided (i.e., separated or decomposed) into a plurality of tiles. Each tile of the plurality of tiles can represent a portion (or a slice) of the aligned point cloud data. For example, aligned scans of point cloud data can be divided into four equal portions or quadrants, with each portion or quadrant representing a quarter of the point cloud data. Each portion or slice of the aligned point cloud data can be further indexed to determine particular memory offsets in memory to store the plurality of tiles. As such, the block address calculator 106 can determine memory addresses of memory as well as memory offsets (i.e., indexes) within the memory to store the plurality of tiles. The block address calculator 106 can output the memory addresses and the memory offsets to memory modules.

As shown in FIG. 1, in some embodiments, the data processing unit 100 can further include a block mask memory 142 and a cell index memory 144 coupled to outputs of the block address calculator 106. In some embodiments, the block mask memory 142 and the cell index memory 144 can be one or more memory modules of a FPGA on which the data processing unit 100 is implemented. Such implementations can improve loading times of the plurality of tiles from an off-chip memory 162 to the block mask memory 142 and the cell index memory 144. In one particular implementation, each of the FPGA memory modules can include 32 high bandwidth memory banks. Each memory bank can include 256 MB of memory space with 256-bit lines. In this particular implementation, 8 of the memory banks can be configured to store data relating to the plurality of tiles, 4 of the memory banks can be configured to store data relating to memory indexes (i.e., offsets), and 1 of the memory banks can be configured to store house-keeping data of the plurality of tiles. In this implementation, because each tile of point cloud data is represented in 64 bits, each line of the 8 memory banks has 4 entries. Similarly, because each index for each tile is represented in 32 bits, each line of the 3 memory banks has 8 entries. The block mask memory 142 and the cell index memory 144 will be discussed in further detail with reference to FIGS. 4A-4B herein.

As shown in FIG. 1, in some embodiments, the data processing unit 100 can further include a cell data memory 148 and a match score calculator 150. The cell data memory 148 can be coupled to the block mask memory 142 and the cell index memory 144. The cell data memory 148 can obtain (i.e., load) point cloud data relating to aligned scans of the point cloud data (i.e., rigid transformed point cloud data) from the off-chip memory 162 through a memory loader 146. Based on this data, the match score calculator 150 can determine a matching score for the aligned scans. In general, the higher a matching score, the higher a probability that the aligned scans depict the same environment. For example, a first scan of point cloud data captured at a location and a second scan of point cloud data captured at the location are processed through rigid transformations to align the two scans. Further, in this example, the aligned scans are further transformed to the world coordinate system as a reference for comparison. In this example, by accessing point cloud data stored in the off-chip memory 106 based on memory address and memory offsets stored in the block mask memory 142 and the cell index memory 144, respectively, the match score calculator 150 can determine a matching score for the aligned scans. This matching score can be outputted. The match score calculator 150, therefore, can generate a matching score for any two aligned scans of point cloud data. Matching scores can be later accessed by general computing processors over a data bus, such as a peripheral component interconnect express (PCIe) bus, for route and navigation planning, for example.

As shown in FIG. 1, in some embodiments, the data processing unit 100 can further include a command interface 130. In various embodiments, the command interface 130 can be a PCIe interface such that the data processing unit 100 can access and/or communicate with other computation modules and/or memory modules onboard the autonomous vehicle. For example, as shown in FIG. 1, the data processing unit 100 can be commanded through the command interface 130 to load point cloud data from the off-chip memory 162. The command interface 130 can be coupled to a command buffer 126. The command buffer 126 can store commands or instructions to be executed by the data processing unit 100 sequentially. That is commands or instructions that arrive first are executed first. In this regard, in some embodiments, the command buffer 126 can be implemented as a first-in-first-out (FIFO) memory. The command buffer 126 can be coupled to a command decoder 128. The command decoder, in some embodiments, can decode commands stored in the command buffer 126 to instructions that are compatible or executable by the rigid transformation unit 102. In general, commands stored in the command buffer 126 are high-level commands. The command decoder 128 can convert (i.e., compile in real-time) the high-level commands into machine-readable instructions compatible with the rigid transformation unit 102. In some cases, the command decoder 128 can decode and transmit high-level commands relating to access of point cloud data stored in the off-chip memory 162. In this way, the point cloud data can be accessed through the cell data memory 148 to determine matching scores two successive scans of the point cloud data. In some embodiments, commands stored in the command buffer 126 can include at least one of a clear command, a load tile command, and a compute command. The clear command instructs the command decoder 128 to clear a command to be executed by either the rigid transformation unit 102 or the memory loader 146. The load tile command instructs the memory loader 146 to load point cloud data of a tile to the cell data memory 148 based on memory address and memory offset values. The compute command instructs the rigid transformation unit 102 to perform rigid transformations.

Figure 2:
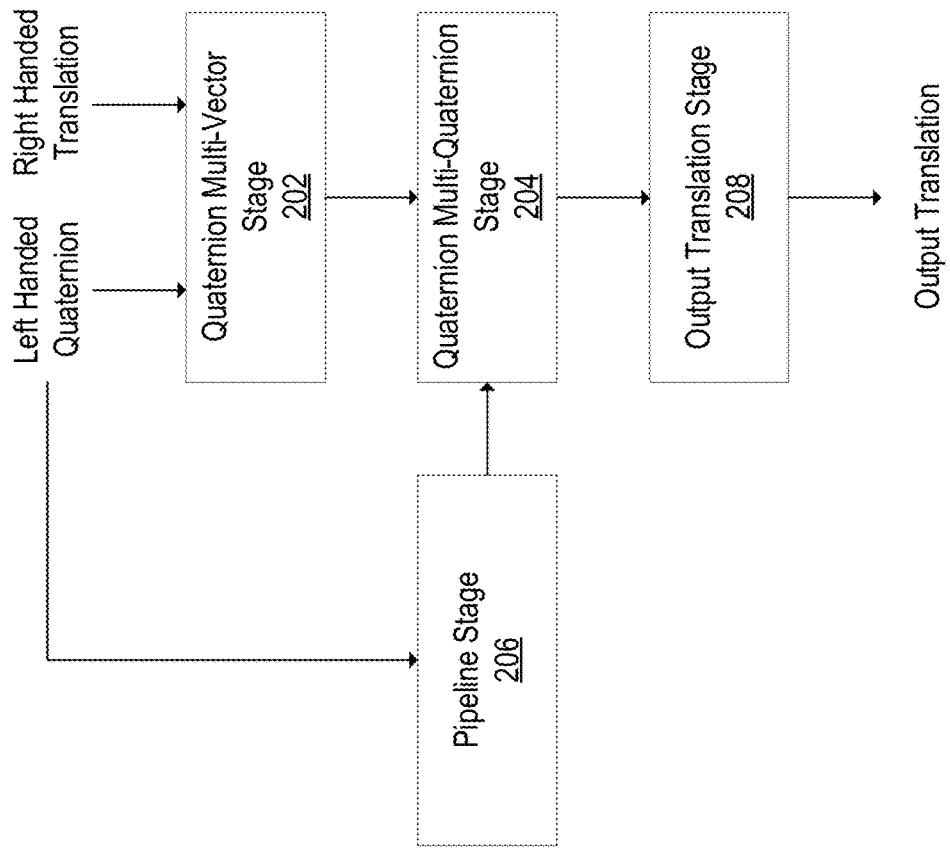
FIG. 2 illustrates pipeline logics of a rigid transformation unit, according to various embodiments of the present disclosure.

FIG. 2 illustrates pipeline logics of a rigid transformation unit 200, according to various embodiments of the present disclosure. In some embodiments, the rigid transformation unit 102 of FIG. 1 can be implemented as the rigid transformation unit 200. The pipeline logics of the rigid transformation unit 200 can be configured to perform a quaternion operation and a translation operation. As shown in FIG. 2, the pipeline logics of the rigid transformation unit 200 can include a quaternion multi-vector stage 202, a quaternion multi-quaternion stage 204, a pipeline stage 206, and an output translation stage 208. Each of the pipeline logics will be discussed below.

In some embodiments, the quaternion multi-vector stage 202 can be configured to generate transformations needed to perform rigid transformations. For example, as shown in FIG. 2, a rigid transformation to be performed can comprise a left-handed quaternion operation and a right-handed translation operation. In this example, the quaternion multi-vector stage 202 can generate transformations needed to perform the left-handed quaternion operation and the right-handed translation operation on a scan of point cloud data. In some embodiments, transformations for a rigid transformation can be matrices with which to operate on point cloud data. For example, the quaternion multi-vector stage 202 can generate a transformation matrix to perform the left-handed quaternion operation and another transformation matrix to perform the right-handed translation operation on the point cloud data.

In some embodiments, the quaternion multi-quaternion state 204 and the pipeline stage 206 can be configured to generate conjugates of the transformations generated by the quaternion multi-vector stage 202. In general, conjugation is a technique that transposes a matrix. For example, a matrix having dimensions of m×n can be transposed to a matrix having dimensions of n×m when applied with a conjugate. The pipeline state 206 can be configured to receive the left-handed quaternion and relays the left-handed quaternion to the quaternion multi-quaternion state 204 so that the conjugates of the transformations can be generated.

In some embodiments, the output translation stage 208 can be configured to apply the transformations and the conjugates relating to the left-handed quaternion operation and the right-handed translation operation to point cloud data. In this way, point cloud data from two different scans can be aligned (i.e., rigid transformed). The aligned scans can be further translated to the world coordinate system to determine a matching score for the aligned scans.

Figure 3:
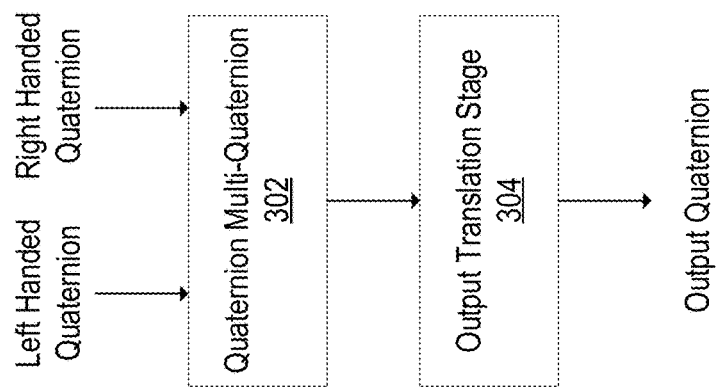
FIG. 3 illustrates pipeline logics of a rigid transformation unit, according to various embodiments of the present disclosure.

FIG. 3 illustrates pipeline logics of a rigid transformation unit 300, according to various embodiments of the present disclosure. In some embodiments, the rigid transformation unit 102 of FIG. 1 can be implemented as the rigid transformation unit 300. The pipeline logics of the rigid transformation unit 300 can be configured to perform two quaternions operations. As shown in FIG. 3, the pipeline logics of the rigid transformation unit 300 can include a quaternion multi-quaternion stage 302 and an output translation stage 304. Each of the pipeline logics will be discussed below.

Functionalities associated with the quaternion multi-quaternion stage 302 are the same as the quaternion multi-quaternion state 204. Therefore, it will not be discussed here. Because rigid transformations performed by the rigid transformation unit 300 do not involve translation operations, the pipeline logics of the rigid transformation unit 300 can be simplified. For example, unlike the pipeline logics of the rigid transformation unit 200, generation of conjugates is not needed because no translation operations are being performed. As such, the quaternion multi-quaternion stage 302 can generate transformations to perform a left-handed quaternion operation and a right-handed quaternion operation. The output translation stage 304 then applies the transformations to point cloud data. In this way, point cloud data from two different scans can be aligned (i.e., rigidly transformed). The aligned scans can be further translated to the world coordinate system to determine a matching score for the aligned scans.

Figure 4A:
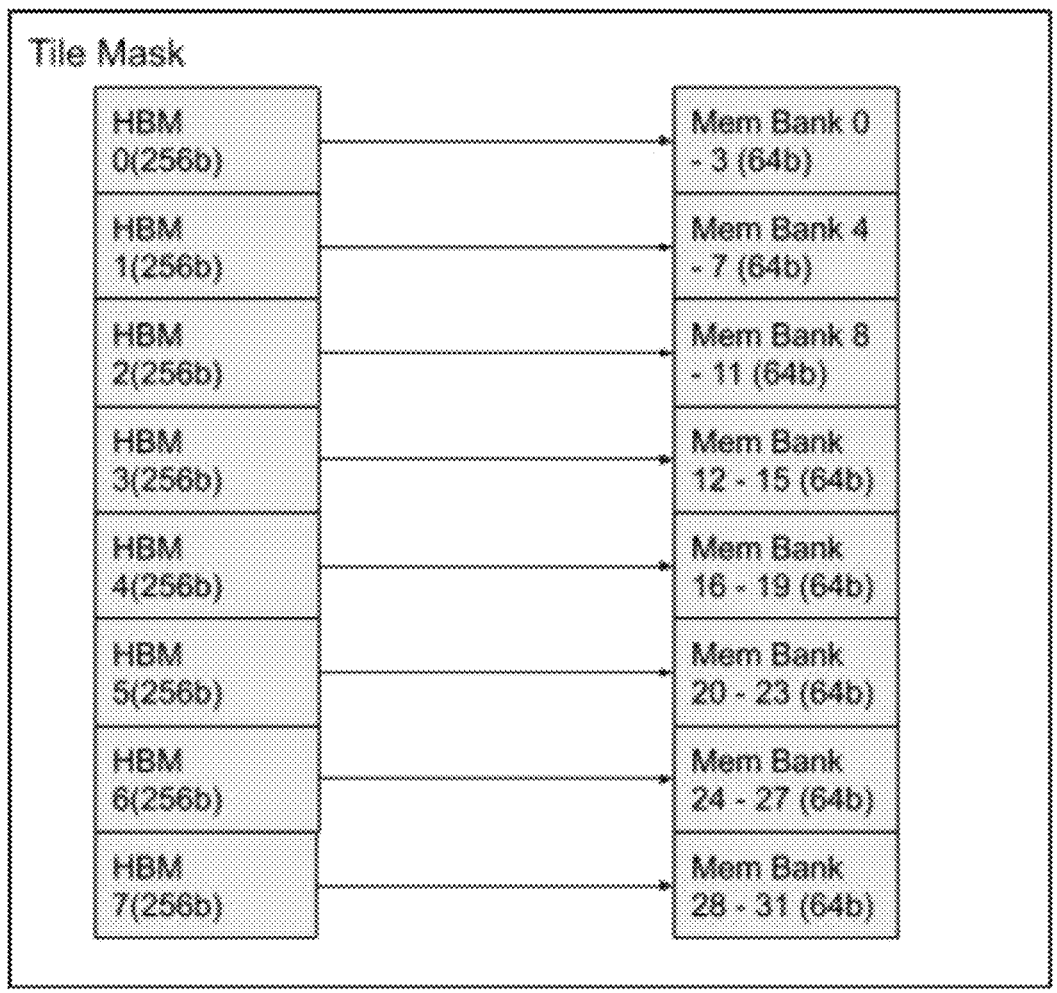
FIGS. 4A-4B illustrate mappings of memory banks to which data associated with a plurality of tiles are stored, according to various embodiments of the present disclosure.
Figure 4B:
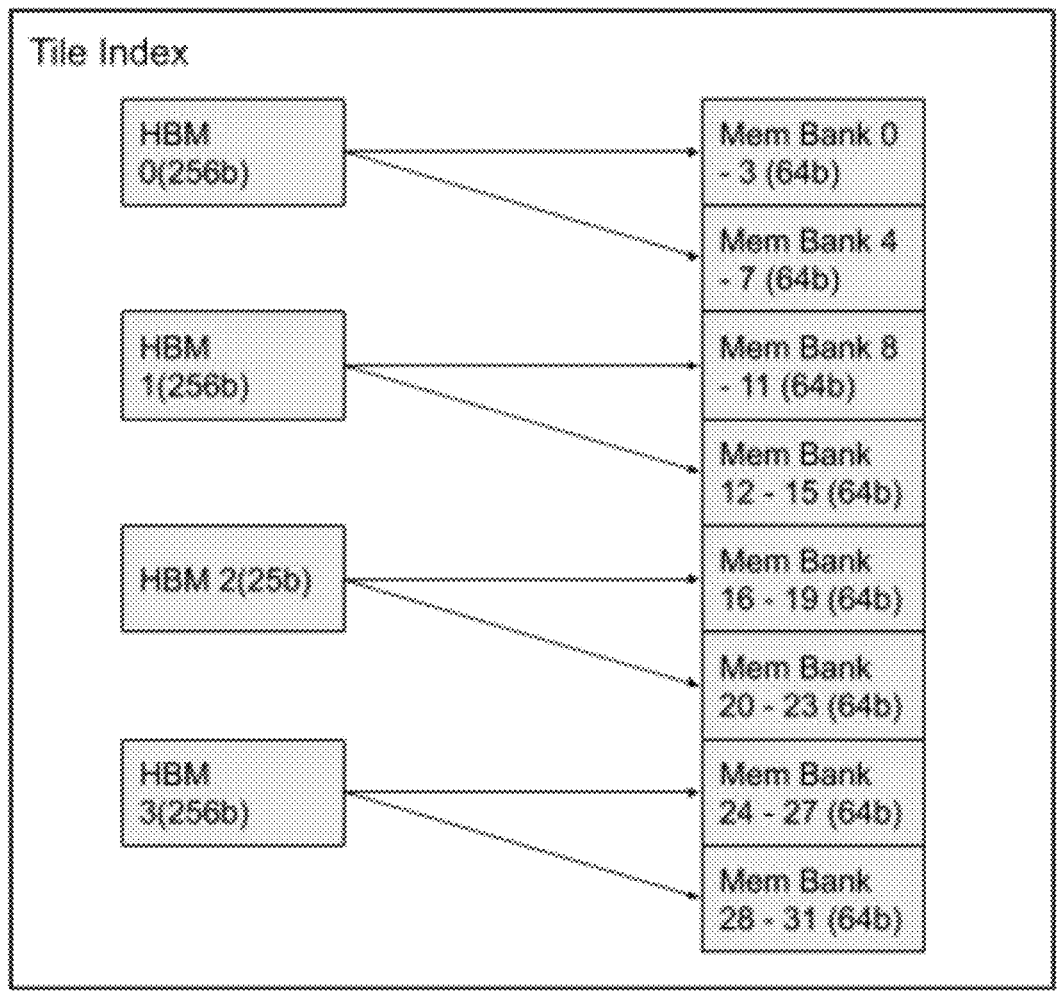

FIGS. 4A-4B illustrate mappings of memory banks to which data associated with a plurality of tiles are stored, according to various embodiments of the present disclosure. FIG. 4A depicts a mapping to store data associated with the plurality of tiles. As discussed, in various embodiments, the data associated with the plurality of tiles can be stored in memory modules of a FPGA. As shown in FIG. 4A, the plurality of tiles can comprise 8 tile with each tile comprising 256 MB of data. In this configuration, the data associated with the plurality of tiles can be stored in a memory comprising 8 memory banks. For example, as shown in FIG. 4A, data for a first tile (i.e., "HBM 0") can be stored in a memory bank with memory offsets of 0-3. In this example, each memory offset can store 64 MB. As another example, data for a second tile (i.e., "HBM 1") can be stored in a memory bank with memory offsets of 4-7, with each memory offset storing 64 MB of data. Similarly, FIG. 4B depicts a mapping to store indexes associated with the plurality of tiles. As shown in FIG. 4B, unlike the data associated with the plurality of tiles, the indexes associated with the plurality of tiles are stored in two memory banks instead of one memory bank. This configuration allows the indexes associated with the plurality of tiles to have redundancy which improves robustness.

Figure 4C:
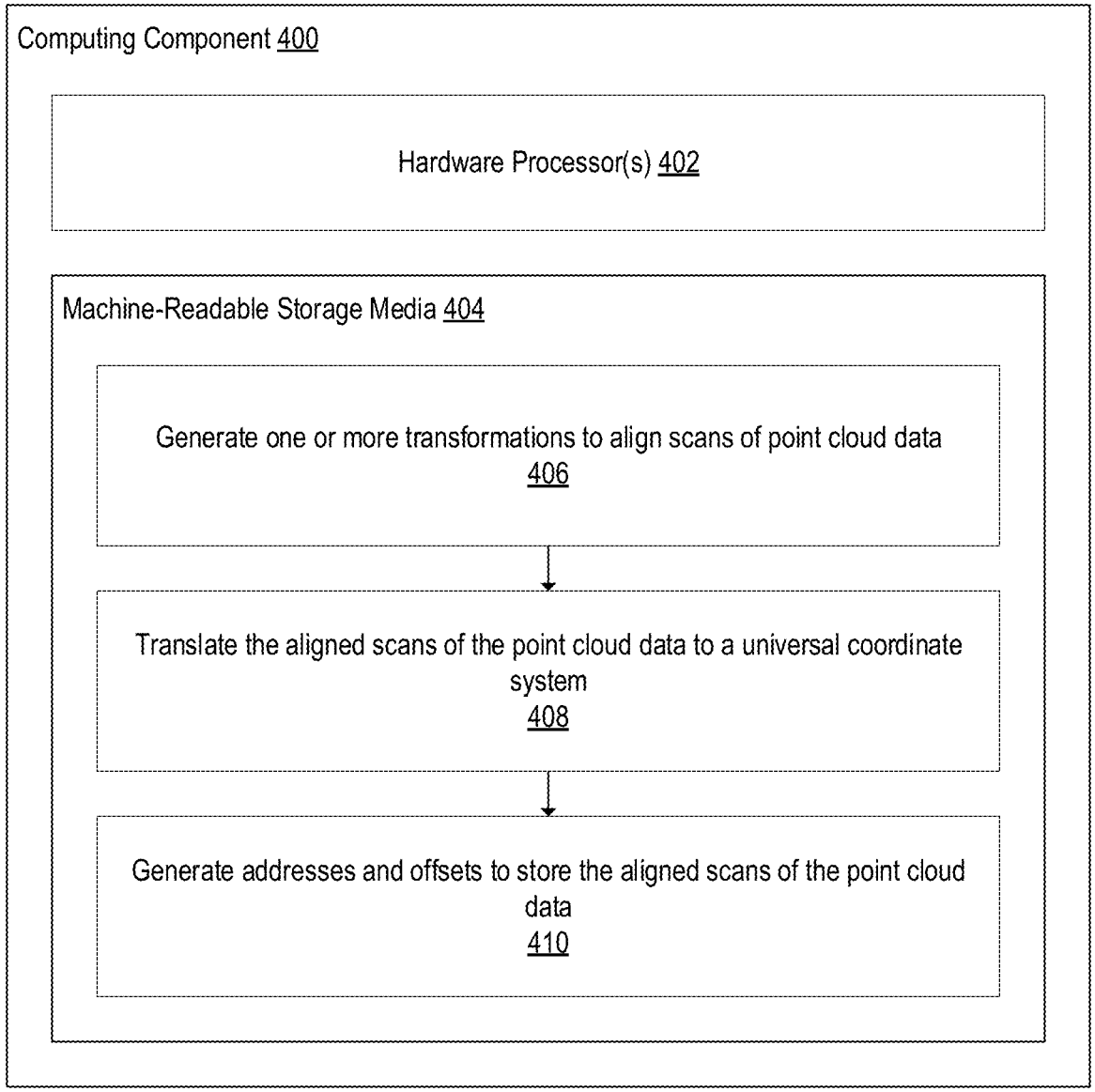
FIG. 4C illustrates a computing component that includes one or more hardware processors and a machine-readable storage media storing a set of machine-readable/machine-executable instructions that, when executed, cause the hardware processor(s) to perform a method, according to various embodiments of the present disclosure.

FIG. 4C illustrates a computing component 400 that includes one or more hardware processors 402 and a machine-readable storage media 404 storing a set of machine-readable/machine-executable instructions that, when executed, cause the hardware processor(s) 402 to perform a method, according to various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the processor 402 can generate one or more transformations to align scans of point cloud data.

At block 408, the processor 402 can translate the aligned scans of the point cloud data to a universal coordinate system.

At block 410, the processor 402 can generate addresses and offsets to store the aligned scans of the point cloud data.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
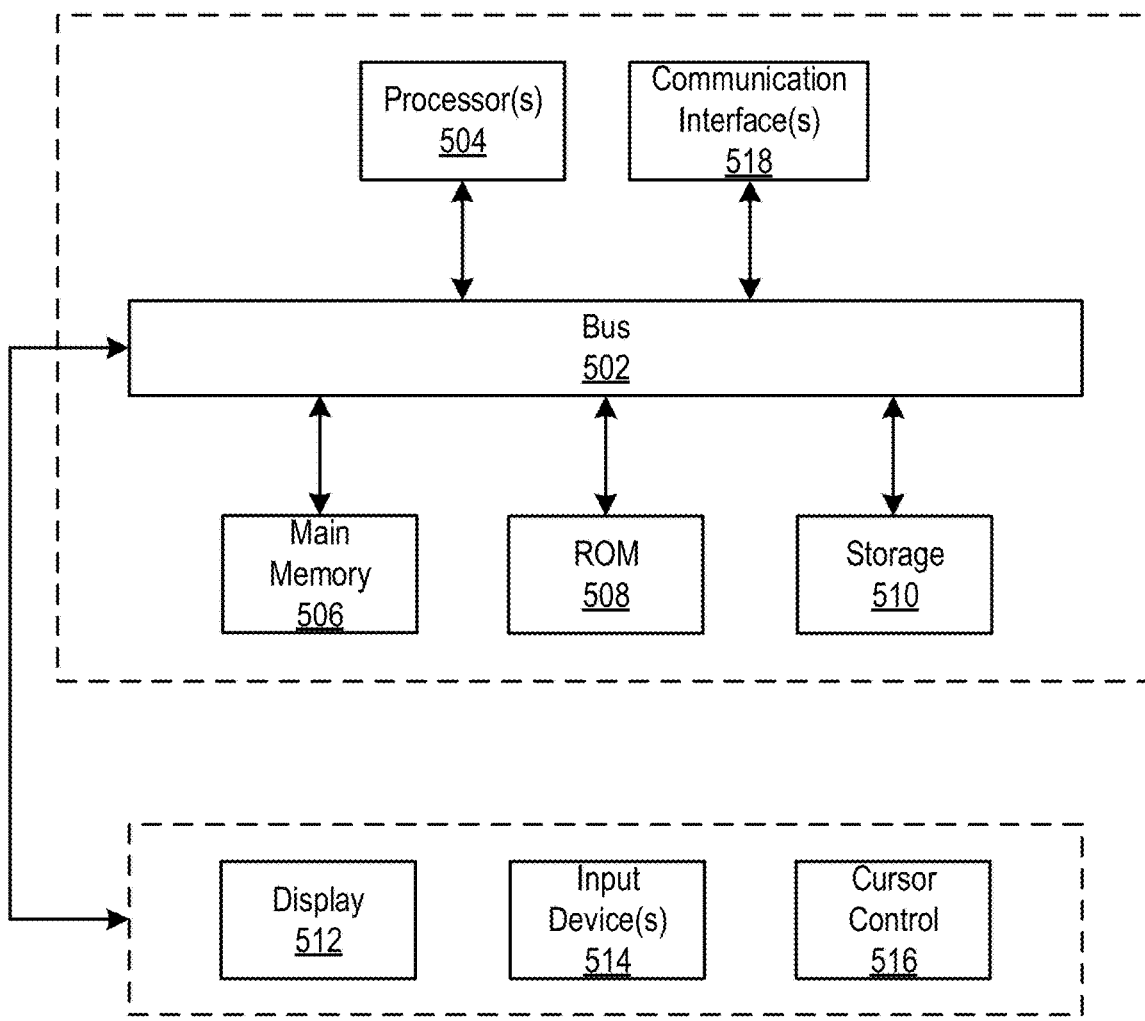
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
a transformation unit configured to generate one or more transformations to align scans of point cloud data;
a translation converter configured to translate the aligned scans of the point cloud data to a universal coordinate system; and
a memory calculator configured to:
divide the aligned scans of the point cloud data into first tiles and second tiles;
generate addresses and offsets to store, in one or more field-gate programmable array (FPGA) memories of one or more FPGAs, the aligned scans of the point cloud data; and
store, in a first FPGA memory, the aligned scans of the point cloud data, wherein the storing of the aligned scans comprises:
storing the first tiles of the point cloud data in a first memory bank of the first FPGA memory, the first memory bank defined according to a first set of indices mapping the first tiles to the first memory bank;
storing the second tiles of the point cloud data in a second memory bank of the first FPGA memory, the second memory bank defined according to a second set of indices mapping the second tiles to the second memory bank; and
store, in a third memory bank and a fourth memory bank of a second FPGA memory, the first set of indices mapping the first tiles to the first memory bank; and
store, in a fifth memory bank and a sixth memory bank of the second FPGA memory, the second set of indices mapping the second tiles to the second memory bank.

2. The system of claim 1, wherein the one or more transformations are transformation matrices that operate on the scans of the point cloud point.

3. The system of claim 2, wherein the matrices perform at least one of a translation operation, a translation operation, a reflection operation, or a glide reflection operation.

4. The system of claim 2, wherein the transformation unit comprises a plurality of logics.

5. The system of claim 4, wherein a first logic is configured to generate the matrices, a second logic is configured to generate conjugates associated with the matrices, and a third logic is configured to apply the matrices and the conjugates to the scans of the point cloud data.

6. The system of claim 1, wherein the universal coordinate system is a world coordinate system.

7. The system of claim 1, further comprising:
a match score calculator configured to determine a matching score for the aligned scans of the point cloud data.

8. The system of claim 7, wherein the matching score indicates whether environments depicted in the aligned scans of the point cloud data are same.

9. The system of claim 7, wherein the transformation unit, the translation converter, the memory calculator, and the match score calculator are implemented on one or more field-gate programmable arrays.

10. The system of claim 1, wherein the one or more transformations comprise a left-handed quaternion operation and a right-handed quaternion operation.

11. The system of claim 10, wherein the one or more transformations comprise application of conjugates related to the left-handed quaternion operation and to the right-handed quaternion operation.

12. A data processing unit to offload processors of an autonomous vehicle, the data processing unit comprising:
a transformation unit configured to generate one or more transformations to align scans of point cloud data;
a translation converter configured to translate the aligned scans of the point cloud data to a universal coordinate system; and
a memory calculator configured to:
divide the aligned scans of the point cloud data into first tiles and second tiles;
generate addresses and offsets to store, in one or more field-gate programmable array (FPGA) memories of one or more FPGAs, the aligned scans of the point cloud data; and
store, in a first FPGA memory, the aligned scans of the point cloud data, wherein the storing of the aligned scans comprises:
storing the first tiles of the point cloud data in a first memory bank of the first FPGA memory, the first memory bank defined according to a first set of indices mapping the first tiles to the first memory bank;
storing the second tiles of the point cloud data in a second memory bank of the first FPGA memory, the second memory bank defined according to a second set of indices mapping the second tiles to the second memory bank; and
store, in a third memory bank and a fourth memory bank of a second FPGA memory, the first set of indices mapping the first tiles to the first memory bank; and
store, in a fifth memory bank and a sixth memory bank of the second FPGA memory, the second set of indices mapping the second tiles to the second memory bank.

13. The data processing unit of claim 12, wherein the one or more transformations are transformation matrices that operate on the scans of the point cloud point.

14. The data processing unit of claim 13, wherein the matrices perform at least one of a translation operation, a translation operation, a reflection operation, or a glide reflection operation.

15. The data processing unit of claim 13, wherein the transformation unit comprises a plurality of logics.

16. The data processing unit of claim 15, wherein a first logic is configured to generate the matrices, a second logic is configured to generate conjugates associated with the matrices, and a third logic is configured to apply the matrices and the conjugates to the scans of the point cloud data.

17. The data processing unit of claim 12, wherein the universal coordinate system is a world coordinate system.

18. The data processing unit of claim 12, further comprising:
a match score calculator configured to determine a matching score for the aligned scans of the point cloud data.

19. The data processing unit of claim 18, wherein the matching score indicates whether environments depicted in the aligned scans of the point cloud data are same.

20. The data processing unit of claim 18, wherein the transformation unit, the translation converter, the memory calculator, and the match score calculator are implemented on one or more field-gate programmable arrays.

* * * * *